T. B. Kirby.
Stump Extractor.
Nº 86,842. Patented Feb. 9, 1869.
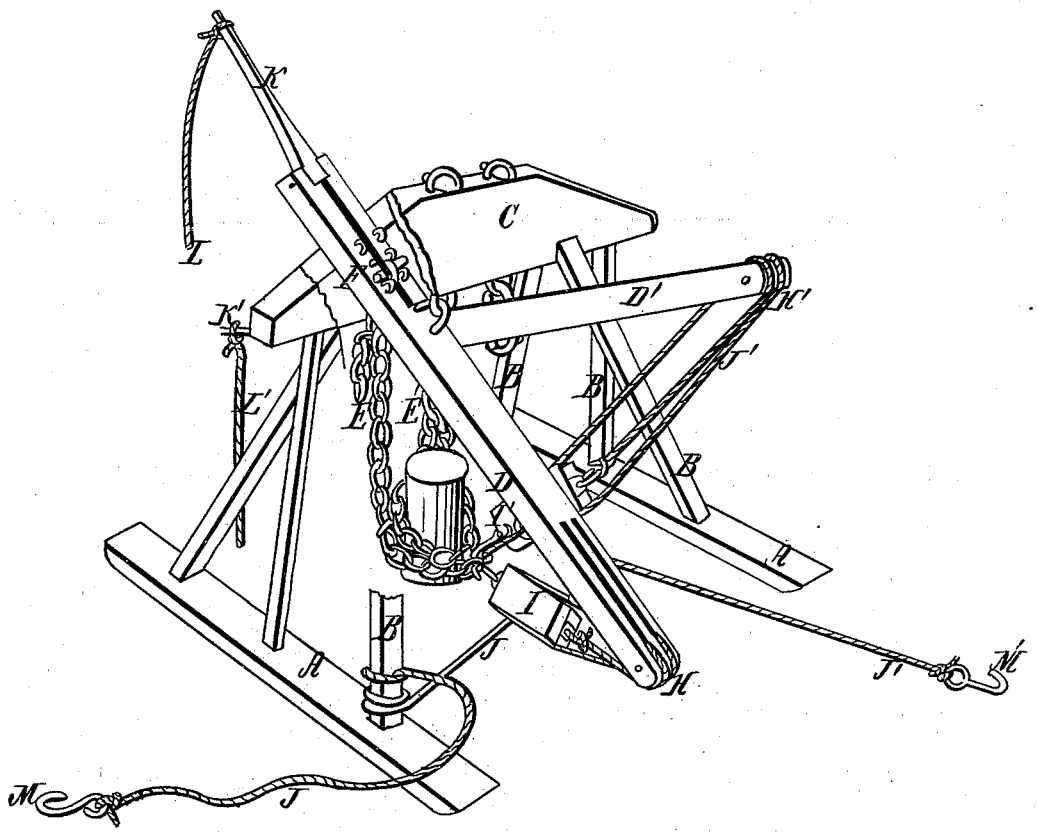
Witnesses:
H. F. Eberts
L. C. Hyde
Inventor:
T. B. Kirby
Per attorney
Thos. S. Sprague

United States Patent Office.

THOMAS B. KIRBY, OF FLOWERFIELD, MICHIGAN.

*Letters Patent No. 86,842, dated February 9, 1869.*

---

STUMP-EXTRACTOR.

---

The Schedule referred to in these Letters Patent and making part of the same.

---

*To whom it may concern:*

Be it known that I, THOMAS B. KIRBY, of Flowerfield, in the county of St. Joseph, and State of Michigan, have invented a new and useful Improvement in Double-Lever Stump-Extractors; and I do declare that the following is a true and accurate description thereof, reference being had to the accompanying drawings, and to the letters of reference marked thereon, and being a part of this specification.

It is a well-known fact that in extracting stumps by what are known as lever stump-extractors, that when the strain on the chain around the stump is slackened, for the purpose of shortening it up, the stump settles back, requiring a part of the work to be done again, and, at the same time, a considerable portion of the travel of the lever is lost, in taking up the slack, and again getting the strain on the stump.

This invention is designed to overcome this objection to the lever-machines, and to afford a powerful and rapid-working apparatus for extracting stumps.

A represents sled-shaped sills, upon which are erected the standards B, supporting a cross-beam, C, to the under side of which are hung the levers D D'. Through slots in their shorter arms, pass the chains E E', secured to the same by a pin, F, passing through a link of the chain on the upper side of the lever, the lower ends of the chain being fastened around the stump to be extracted.

The longer arms of the levers are provided with double sheaves H H', through which, and the blocks I I', are reeved the draught-ropes J J'. These blocks are hooked to the chains E E' around the stump.

To the short arms of the levers are hinged the extension-arms K K', to which are secured the cords L L', by means of which the short arms of the levers are drawn down when required.

M M' are hooks in the outer ends of the draught-ropes, by means of which the team is attached to the same.

To explain the operation of this device, we will suppose that it straddles a stump to be extracted, around which are firmly secured the chains E E'. The short arms of the levers D D' are next drawn down close to the ground by means of the cords L L'. As the levers approach the ground, the extension-arms K K' are folded up, so as not to interfere with the descent of the levers. The chains E E' are drawn up through the slots in the short arms of the levers, and secured by a pin, F. The blocks I I' are next hooked to the chains around the stump. The ropes J J' are next hooked to the whiffle-trees of the team, by means of the hooks M M'. The team is then started forward, and the stump begins to rise out of place, until the long arms of the levers reach the ground, when the rope J is detached, and secured around one of the standards, or other suitable object, to retain the strain on the chain E, and prevent the stump from settling back, when the rope J' is slackened, to allow the chain E on the lever D' to be shortened. When this is effected, the team again brings a strain on the rope J', when the stump is drawn out of the ground. If not, the rope on the lever D is slackened, and its chain E shortened, and the operation repeated alternately with each lever, until the object is accomplished.

I do not claim the invention patented by C. E. Galligan, March 24, 1868; but

What I claim as my invention, and desire to secure by Letters Patent, is—

The combination of the double levers D D', provided with chains E E', pins F, sheaves H H', blocks I I', draught-ropes J J', with their hooks M M', and the levers K K', with their ropes L, when constructed and arranged to operate as and for the purposes set forth.

THOMAS B. KIRBY.

Witnesses:
J. M. KIRBY,
S. G. BLISS.